United States Patent Office 3,296,072
Patented Jan. 3, 1967

---

3,296,072
METHOD OF TREATING MENTAL DEPRESSION
Jacob Szmuszkovicz, Kalamazoo, Mich., assignor to The Upjohn Company, Kalamazoo, Mich., a corporation of Delaware
No Drawing. Original application June 11, 1962, Ser. No. 201,251. Divided and this application Jan. 29, 1964, Ser. No. 341,101
2 Claims. (Cl. 167—65)

The present invention relates to novel 7-alkyl-3-(2-amino-2-alkylethyl)indoles and more particularly is directed to 7 - alkyl - 3 - (2-amino-2-alkylethyl)indole free bases, pharmacologically acceptable acid addition salts thereof, and composition containing said novel compounds as active ingredient.

This application is a division of application Serial No. 201,251, filed June 11, 1962, now abandoned.

The novel 7-alkyl-3-(2-amino-2-alkylethyl)indole free bases of the present invention can be represented by the formula:

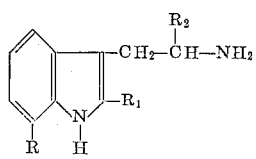

wherein R is alkyl of 1 to 4 carbon atoms, inclusive, e.g., methyl, ethyl, propyl, isopropyl, butyl, isobutyl and the like; $R_1$ represents hydrogen, methyl and ethyl; and $R_2$ represents methyl and ethyl.

In view of the presence of an asymmetric carbon atom, the novel 7-alkyl-3-(2-amino-2-alkylethyl)indoles of the present invention can exist as the d- and l-isomers or as a racemic mixture. In accordance with the methods of synthesis set forth below, the compounds are obtained as racemates. The racemates can be resolved, if so desired, into the d- and l-isomers.

The novel compounds of the present invention can be prepared by various procedures known in the art. For example, the novel 7-alkyl-3-(2-amino-2-alkylethyl)indole free bases can be prepared by the process disclosed by Snyder et al., J. Am. Chem. Soc. 69, 3140, 1947. A 7-alkylgramine is reacted with nitroethane or 1-nitropropane and the resulting nitro derivative is hydrogenated in the presence of a base metal catalyst, e.g., Raney nickel, or a noble metal catalyst, e.g., platinum oxide, or is reduced with lithium aluminum hydride. The 7-alkylgramines can be prepared by the process of Rydon, J. Chem. Soc., 1948, 705.

Alternatively, the novel 7 - alkyl - 3 - (2-amino-2-alkylethyl)indole free bases can be prepared by the process disclosed by Heinzelman et al., J. Org. Chem. 25, 1948, 1960. A 7-alkylindole-3-carboxaldehyde is reacted with nitroethane or 1-nitropropane to produce a 2-(7-alkylindoleninidenium)ethyl nitronate and the nitronate is reduced with lithium aluminum hydride. The starting 7-alkylindole-3-carboxaldehydes, e.g., 7-methylindole-3-carboxaldehyde, can be prepared by processes such as those disclosed by Boyd et al., Biochem. J. 29, 555, 1935; Smith J. Chem. Soc., 1954, 3842; and Sumpter and Miller, "Heterocyclic Compounds With Indole and Carbozole Systems," Interscience Publishers, 1954, pages 4 to 42.

The 7-alkyl-3-unsubstituted-indoles utilized in the preparation of the 7-alkylgramines and 7-alkylindole-3-carboxaldehydes can be prepared by the well-known Fischer synthesis, involving the cyclization of alkylphenylhydrazones of aldehydes and ketones under acidic conditions. Alternatively, the starting indoles can be prepared by cyclizing a 2-methyl-6-alkylformanilide, 2-methyl-6-alkylacetanilide, or 2-methyl-6-alkylpropionanilide in the presence of sodium amide, utilizing the general procedure disclosed by Verley et al., Bull. Soc. Chem. France 37, 189, 1925. Still another process for the preparation of the starting indoles is disclosed in British Patent 744,765, wherein a properly substituted benzaldehyde is condensed with a nitroalkane to produce a benzyl alcohol, dehydrating the alcohol, and reductively cyclizing the resulting product.

7-alkyl-3-(2-amino-2-alkylethyl)indole acid addition salts of the present invention can be readily prepared by mixing a free base of the invention and an organic or inorganic acid in an aqueous or non-aqueous medium. Examples of acids are hydrochloric, hydrobromic, sulfuric, phosphoric, pyruvic, acetic, tartaric, citric, benzoic and pamoic acids, and the like.

The following examples are illustrative of the products of the present invention but are not to be construed as limiting.

EXAMPLE 1.—7 - METHYL-3-(2 - AMINOBUTYL) INDOLE FREE BASE AND HYDROCHLORIDE THEREOF

A. 7-methylgramine

A cooled solution of 67.3 ml. of glacial acetic acid and 92.75 ml. (0.514 mole) of 25% aqueous dimethylamine was mixed with 33.9 ml. (0.418 mole) of 37% aqueous formaldehyde at such a rate that the temperature of the mixture did not rise above 5° C. The stirred solution was warmed to 25° C. and 50.0 g. (0.381 mole) of 7-methylindole was added gradually. This mixture was cooled in an ice bath to keep the temperature at about 25° C. After 2 hours the homogeneous solution was poured into water, and the resulting mixture was decolorized with activated charcoal, and filtered. The filtrate was diluted to about 1 liter with water, cooled in an ice bath, and made basic with concentrated aqueous sodium hydroxide solution. The resulting white crystalline precipitate was collected by filtration, washed with water, and dried under reduced pressure over solid potassium hydroxide to yield 75.4 g. of 7-methylgramine which was slightly damp. An analytical sample prepared by recrystallization from methanol-water melted between 119–122° C.

Analysis.—Calcd. for $C_{12}H_{16}N_2$: C, 76.55; H, 8.57; N, 14.88. Found: C, 76.58; H, 8.33; N, 14.55.

B. 7-methyl-3-(2-nitrobutyl)indole

A solution of 65.4 g. of the damp 7-methylgramine (Part A) in 400 ml. of 1-nitropropane was concentrated to about 300 ml. with azeotropic distillation of the water present in the reaction mixture. The resulting solution was cooled to 25° C. and treated with 16 g. of powdered sodium hydroxide. A stream of nitrogen was passed through this mixture while it was refluxed gently for 10 hours. The mixture was cooled, poured into water, and extracted with ether. The ether extract was washed successively with dilute acetic acid, water, dilute ammonium hydroxide, and saturated sodium chloride solution, and was then dried over anhydrous sodium sulfate and concentrated under reduced pressure. Traces of 1-nitropropane were removed by azeotropic distillation with toluene and then with benzene to obtain 7-methyl-3-(2-nitrobutyl)indole as a dark oil.

C. *7-methyl-3-(2-aminobutyl)indole free base and hydrochloride thereof*

A solution of 7-methyl-3-(2-nitrobutyl)indole (Part B) in 600 ml. of ethanol was stirred for 1 hour at 25° C. with 6 g. of Raney nickel catalyst. The mixture was filtered and the filtrate was hydrogenated in two equal portions at 25° C. in the presence of 6 g. of Raney nickel catalyst each at an initial hydrogen pressure of 40 p.s.i. In each instance the reaction was complete after 4 hours. The reaction mixtures were combined and filtered. The filtrate was concentrated to dryness under reduced pressure. A solution of the residue in dilute acetic acid was decolorized with activated charcoal, made ammoniacal, and extracted with ether. The ether extract was washed with saturated sodium chloride solution, dried over anhydrous sodium sulfate, and concentrated to dryness under reduced pressure to obtain 7-methyl-3-(2-aminobutyl)indole free base. An ethyl acetate solution of the free base was prepared and treated with dry ethereal hydrogen chloride. The resulting crystalline precipitate was collected by filtration and recrystallized from methanol-ethyl acetate to yield 50.4 g. of 7-methyl-3-(2-aminobutyl)indole hydrochloride (63.8% yield based on 7-methylindole). On another recrystallization from methanol-ethyl acetate the 7-methyl-3-(2-aminobutyl)indole hydrochloride melted between 206.5–208° C.

*Analysis.*—Calcd. for $C_{13}H_{19}ClN_2$: C, 65.39; H, 8.02; N, 11.74; Cl, 14.85. Found: C, 65.46; H, 8.10; N, 11.40; Cl, 14.72.

EXAMPLE 2.—2,7-DIMETHYL-3-(2-AMINOBUTYL)INDOLE FREE BASE AND ACETATE THEREOF

A. *2,7-dimethylgramine*

Acetic acid (50.6 ml.) was added during a 15-minute period to 67.0 ml. of dimethylamine (25% aqueous solution) while cooling in ice and 25.4 ml. of 37% aqueous formaldehyde was then added during a 10-minute period. 2,7-dimethylindole (40.4 g., 0.34 mole) was added to the mixture over a 15-minute period. The mixture was stirred in the cold for 1 hour, and then at 25° C. for 16 hours. Water (50 ml.) was added, the mixture was extracted with ether (two 50-ml. portions), and the combined ether extracts were washed with water (two 50-ml. portions). The water washings and the original ether-extracted aqueous layer were combined and extracted with ether. The resulting clear yellow aqueous layer was cooled in ice and basified with 250 ml. of 10% aqueous sodium hydroxide solution. The resulting oil was extracted with ether (three 100-ml. portions). The combined ether extracts were washed with saturated sodium chloride solution, dried over anhydrous sodium sulfate, and evaporated under reduced pressure between 30–40° C. to give 22 g. of 2,7-dimethylgramine (32% yield).

B. *2,7-dimethyl-3-(2-nitrobutyl)indole*

A mixture of 2,7-dimethylgramine (22 g., 0.109 mole), 95 ml. of 1-nitropropane, and 5 g. of sodium hydroxide was refluxed for 6 hours with stirring while bubbling nitrogen through the mixture, 100 ml. of benzene was added, and refluxing was continued under the same conditions for 1.5 hours. The mixture was cooled in ice and 95 ml. of 10% aqueous acetic acid was added. The aqueous layer was extracted with ether (two 50-ml. portions). The combined organic solution was then washed with water and saturated sodium chloride solution and dried over anhydrous sodium sulfate. On evaporation, 22 g. of 2,7-dimethyl-3-(2-nitrobutyl)indole was obtained as a brown oil.

C. *2,7-dimethyl-3-(2-aminobutyl)indole free base and acetate thereof*

2,7-dimethyl-3-(2-nitrobutyl)indole (22 g., 0.09 mole) was dissolved in 200 ml. of ethanol and a teaspoon of Raney nickel catalyst (washed three times with ethanol) was added. The mixture was refluxed for 15 minutes and filtered. A teaspoon of Raney nickel catalyst was added to the filtrate and hydrogenation was carried out at an initial hydrogen pressure of 50 p.s.i. After 22.5 hours, 93% of the theoretical amount of hydrogen was absorbed. The mixture was filtered and evaporated between 40–50° C. under reduced pressure to produce 17 g. of a brown oil. Distillation of 15 g. of this oil in an oil-jacketed flask at a pressure of 0.1 mm. of mercury (bath temperature 180–190° C.) afforded 8 g. of 2,7-dimethyl-3-(2-aminobutyl)indole free base as a yellow oil. The yellow oil was dissolved in 5 ml. of ethyl acetate, 2.3 ml. of acetic acid was added, and the solution was cooled to about 5° C. The solid (7.5 g.) which separated on cooling was recovered by filtration. A 0.3 g. sample was recrystallized from 20 ml. of ethyl acetate containing a drop of acetic acid to give 2,7-dimethyl-3-(2-aminobutyl)indole acetate which melted between 167–168° C.

*Analysis.*—Calcd. for $C_{16}H_{24}N_2O_2$: C, 69.53; H, 8.75; N, 10.14. Found: C, 68.89; H, 8.22; N, 10.11.

EXAMPLE 3.—7-METHYL-(2-AMINOPROPYL)INDOLE FREE BASE AND SULFATE THEREOF

In the same manner as shown in Example 1, 7-methyl-3-(2-aminopropyl)indole free base was prepared by substituting nitroethane for 1-nitropropane, and 7-methyl-3-(2-aminopropyl)indole sulfate was prepared by substituting 7-methyl-3-(2-aminopropyl)indole free base and sulfuric acid for 7-methyl-3-(2-aminobutyl)indole free base and hydrogen chloride.

EXAMPLE 4.—2,7 - DIMETHYL-3-(2 - AMINOPROPYL) INDOLE FREE BASE AND HYDROCHLORIDE THEREOF

In the same manner as shown in Example 2, 2,7-dimethyl-3-(2-aminopropyl)indole free base was prepared by substituting nitroethane for 1-nitropropane and 2,7-dimethyl-3-(2-aminopropyl)indole hydrochloride was prepared by substituting 2,7-dimethyl-3-(2-aminopropyl)indole free base and hydrogen chloride for 2,7-dimethyl-3-(2-aminobutyl)indole free base and acetic acid.

EXAMPLE 5.—7-ETHYL-3-(2-AMINOBUTYL)INDOLE FREE BASE AND ACETATE THEREOF

In the same manner as shown in Example 1, 7-ethyl-3-(2-aminobutyl)indole free base was prepared by substituting 7-ethylindole for 7-methylindole, and 7-ethyl-3-(2-aminobutyl)indole acetate was prepared by substituting 7-ethyl-3-(2-aminobutyl)indole free base and acetic acid for 7-methyl-3-(2-aminobutyl)indole free base and hydrogen chloride.

EXAMPLE 6.—2,7-DIETHYL-3-(2 - AMINOBUTYL) INDOLE FREE BASE AND HYDROBROMIDE THEREOF

In the same manner as shown in Example 2, 2,7-diethyl-3-(2-aminobutyl)indole free base was prepared by substituting 2,7-diethylindole for 2,7-dimethylindole, and 2,7-diethyl-3-(2-aminobutyl)indole hydrobromide was prepared by substituting 2,7-diethyl-3-(2-aminobutyl)indole free base and hydrobromic acid for 2,7-dimethyl-3-(2-aminobutyl)indole free base and acetic acid.

EXAMPLE 7.—7-PROPYL-3-(2-AMINOPROPYL)INDOLE FREE BASE AND TARTRATE THEREOF

In the same manner as shown in Example 1, 7-propyl-3-(2-aminopropyl)indole free base was prepared by substituting 7-propylindole and nitroethane for 7-methylindole and 1-nitropropane, and 7-propyl-3-(2-aminopropyl) indole tartrate was prepared by substituting 7-propyl-3-(2-aminopropyl)indole free base and tartaric acid for 7-methyl-3-(2-aminobutyl)indole free base and hydrogen chloride.

EXAMPLE 8.—2-METHYL-7-PROPYL-3-(2 - AMINO-PROPYL)INDOLE FREE BASE AND PYRUVATE THEREOF

In the same manner as shown in Example 2, 2-methyl-7-propyl-3-(2-aminopropyl)indole free base was prepared by substituting 2-methyl-7-propylindole and nitroethane for 2,7-dimethylindole and 1-nitropropane, and 2-methyl-7-propyl-3-(2-aminopropyl)indole pyruvate was prepared by substituting 2-methyl-7-propyl-3-(2 - aminopropyl)indole free base and pyruvic acid for 2,7-dimethyl-3-(2-aminobutyl)indole free base and acetic acid.

EXAMPLE 9.—7-BUTYL-3-(2-AMINOBUTYL)INDOLE FREE BASE AND BENZOATE THEREOF

In the same manner as shown in Example 1, 7-butyl-3-(2-aminobutyl)indole free base was prepared by substituting 7-butylindole for 7-methylindole, and 7-butyl-3-(2-aminobutyl)indole benzoate was prepared by substituting 7-butyl-3-(2-aminobutyl)indole free base and benzoic acid for 7-methyl-3-(2-aminobutyl)indole free base and hydrogen chloride.

EXAMPLE 10.—2-ETHYL-7 - BUTYL-3-(2 - AMINOBUTYL)INDOLE FREE BASE AND PAMOATE THEREOF

In the same manner as shown in Example 2, 2-ethyl-7-butyl-3-(2-aminobutyl)indole free base was prepared by substituting 2-ethyl-7-butylindole for 2,7-dimethylindole, and 2-ethyl-7-butyl-3-(2-aminobutyl)indole pamoate was prepared by substituting 2-ethyl-7-butyl-3-(2-aminobutyl)indole free base and pamoic acid for 2,7-dimethyl-3-(2-aminobutyl)indole free base and acetic acid.

EXAMPLE 11.—2-METHYL-7-ETHYL-3-(2-AMINOPROPYLINDOLE FREE BASE

In the same manner as shown in Example 2, 2-methyl-7-ethyl-3-(2-aminopropyl)indole free base was prepared by substituting 2-methyl-7-ethylindole and nitroethane for 2,7-dimethylindole and 1-nitropropane.

The compounds of the present invention are useful as stimulants in the treatment of mental depressant states in animals and mammals. The novel compounds have the ability to induce direct stimulation to counteract mental depression as well as the ability to inhibit oxidate deamination of serotonin and catechol amines by the enzyme, monamine oxidase (hereinafter designated as MAO). Thus, in rats when administered intraperitoneally the novel compounds have the ability to inhibit the monamine oxidase enzyme.

The role of serotonin in brain function and the destruction of serotonin in the brain by MAO are well-known phenomena (Udenfriend et al., Annals New York Academy of Sciences 66, 602, 1957). Serotonin does not cross the blood-brain barrier so that desired levels of serotonin cannot be maintained by administering serotonin to replace the amount lost through MAO activity. Serotonin is produced in the brain by decarboxylation of its amino acid precursor, 5-hydroxytryptophan, which can cross the blood-brain barrier. The decarboxylation is effected by the enzyme 5-hydroxytryptophan decarboxylase. The regulation of serotonin levels by the administration of a MAO inhibitor is thus highly desirable. The compounds of the present invention have this MAO inhibitory characteristic to a high degree. In addition thereto, the compounds of the present invention possess an additional advantage in that they do not inhibit 5-hydroxylation of tryptophan to 5-hydroxytryptophan which also occurs in the natural sequence of serotonin development in the manual. Furthermore, the present compounds also possess a decided advantage over certain compounds utilized as MAO inhibitors, e.g., hydrazine compounds, in that they do not interfere with the activity of 5-hydroxytryptophan decarboxylase, which enzyme is essential for the formation of serotonin from 5-hydroxytryptophan.

In animal testing the compounds of the present invention have demonstrated a clear superiority over α-ethyltryptamine acetate [3-(2-aminobutyl)indole acetated], a well-known anti-depressant. For example, Table I demonstrates (in vivo tests in rats) that 7-methyl-3-(2-aminobutyl)indole hydrochloride increased brain serotonin 2 to 4 times as much as α-ethyltryptamine acetate.

TABLE I

| Compound | Dose, mg./kg. I.P. | Brain Serotonin—percent increase over control (1 hr. after dosing; each value is the average of 2 rats) |
|---|---|---|
| α-ethyltryptamine acetate | 2.5 | 22, 30, 48 |
|  | 5 | 20, 18, 42 |
|  | 10 | 22, 25, 53 |
| 7-methyl-3-(2-aminobutyl) indole hydrochloride | 1 | 30 |
|  | 2 | 60 |
|  | 4 | 70 |
|  | 6 | 90 |
|  | 10 | 90 |

The activity of the compounds of the invention as MAO inhibitors also makes them valuable as laboratory agents. Thus the compounds of the invention can be used in the research laboratory to inhibit selectively MAO in mixed enzyme systems. They can also be used in the characterization and quantitative determination of MAO in the laboratory.

Furthermore, the 7-alkyl-3-(2-amino-2-alkylethyl)indoles of the present invention can be reacted with fluosilicic acid in accordance with U.S. Patents 1,915,334 and 2,075,359 for preparing amine fluosilicate mothproofing agents and in accordance with U.S. Patents 2,425,320 and 2,606,115 in preparing amine thiocyanate-formaldehyde condensation products for use as pickling inhibitors.

As pointed out above, the 7-alkyl-3-(2-amino-2-alkylethyl)indole racemic mixtures of this invention [e.g., dl-7-methyl-3-(2-aminobutyl)indole] can be resolved into the d- and l-isomers. For this purpose there can be employed optically active acids commonly used for the resolution of amines, e.g., d-10-camphorsulfonic acid, d-tartaric acid, dibenzoyl-d-tartaric acid (the dibenzoate of d-tartaric acid), d-camphoric acid, and the like. The diastereoisomeric dd and dl salts can be separated by fractional crystallization, e.g., using ethanol. Alternatively, a mixture of the diastereoisomeric dd and dl salts in solid form can be separated mechanically, by virtue of the different crystalline form of the diastereoisomers.

The separated dd diastereoisomeric salt [e.g., d-7-methyl-3-(2-aminobutyl)indole dibenzoyl-d-tartrate] is then dissolved in water, the solution is made alkaline with ammonium hydroxide (other bases such as sodium hydroxide or potassium hydroxide can likewise be employed), and the mixture is extracted with a water-immiscible solvent such as diethyl ether. The organic phase is separated, dried, and the dried solution is concentrated to dryness to obtain the desired d-7-alkyl-3-(2-amino-2-alkylethyl)indole, e.g., d-7-methyl-3-(2-aminobutyl)indole free base, as a residue. Starting with the dl salt instead of the dd salt, the corresponding l-7-alkyl-3-(2-amino-2-alkylethyl)indole, e.g., l-7-methyl-3-(2-aminobutyl)indole free base, is obtained in the same manner.

The pharmaceutical forms contemplated by this invention include pharmaceutical compositions suited for oral and injection use. The oral compositions include both solid and liquid forms. Solid compositions may be in the form of tablets, coated or uncoated; capsules, hard or soft; powders; granules; pills and the like. Suitable solid diluents or carriers for such compositions include lipids, carbohydrates, proteins and mineral solids. The liquid compositions can be in the form of emulsions, solutions, suspensions, syrups, and elixirs.

The tablets contain the active ingredient in the required amount with pharmaceutical diluents or excipients, binders, disintegrators, and lubricants. The active ingredient is suitably comminuted with a carbohydrate diluent (e.g., starch and sucrose), a mineral solid (e.g., kaolin and dicalcium phosphate) and the like, to form the basic powder mixture. The said mixture can be granulated by wetting with a protein binder such as gelatin solution, or a carbohydrate such as acacia mucilage and corn syrup, and is then screened to desired particle sizes. As an alternative to granulating, the mixture can be slugged through the tablet machine and the slugs comminuted prior to formation of the tablets. A carbohydrate disintegrating agent (e.g., cornstarch) is advantageously added at the time of preparing the basic mixture. The lubricant, for example, a lipid (such as stearic acid, a stearate salt or mineral oil), a mineral solid (such as talc), and the like is used to prevent sticking of the mixture to the tablet-forming dies. The tablets can be coated or left uncoated. Suitable coatings include a sealing coat of shellac, a taste-disguising carbohydrate coating (such as sugar or methylcellulose), and a lipid polish coating such as carnauba wax. Special coatings can comprise (a) lipid-type coatings of a semi-permeable nature for delaying absorption of the active ingredient to provide sustained action or (b) enteric substances (such as styrene-maleic acid copolymer and cellulose acetate phthalate) to resist release of the active ingredient in the stomach and permit release in the upper intestine.

The capsules for oral use can comprise a mixture of the active ingredient in combination with a pharmaceutical diluent and a gelatin sheath enclosing said mixture. The capsules can be in the form of soft capsules enclosing the active ingredient in the required amount with suitable diluents such as edible oils, or hard capsules comprising mineral solids (e.g., talc or calcium carbonate) and, optionally, lubricants (e.g., calcium or magnesium stearate salts).

The powers are conveniently prepared by comminuting the active ingredient and mixing with an acceptable diluent (e.g., an edible carbohydrate such as starch) and advantageously include sweetening and flavoring agents (such as sugar saccharin, a cyclamate salt or flavoring oil).

Pills include the required amount of the active ingredient plus suitable diluents, binders, disintegrators and lubricants as heretofore set forth with respect to tablets and capsules. The pills are suitably prepared by the rolling technique or other known methods, advantageously with the use of the aforesaid lubricants.

The granules for oral use contain the required amount of the active ingredient admixed with a dispersing agent, e.g., naturally-occurring phosphatides, a condensation product of ethylene oxide with fatty acids or fatty alcohols, partial esters of fatty acids and a hexitol anhydride, and polyoxyethlene condensation products of the esters. Advantageously these compositions contain sweetening agents, such as sucrose, saccharin, cyclamate salts and the like, together with flavoring and coloring agents.

For the treatment of domestic birds and mammals by oral administration, the therapeutic ingredient is conveniently prepared in the form of a food premix. The food premix can comprise the active ingredient in admixture with an edible diluent such as starch, oatmeal, flour, calcium carbonate, talc, dried fish meal and like non-toxic, orally-acceptable diluents. The prepared premix is then conveniently added to the regular feed, thereby supplying the included medication to the animal or bird in the course of feeding.

As set forth above, the oral liquid compositions include emulsions, solutions and suspensions, especially in the form of syrups and elixirs. The emulsions are preferably of the oil-in-water type and contain the active ingredient in the required amount with acceptable emulsifying agents, such as gum acacia, gum tragacanth, naturally-occurring phosphatides, and the like. Suitable sweetening, coloring, and flavoring agents are added to the aqueous phase of the emulsion. Under ordinary conditions of storage and use, the emulsions are kept free from microorganism growth by the addition of a preservative, such as methylparaben and propylparaben. Ethanol in a concentration of 12 to 15% can be used as an auxiliary preservative.

Solutions of the active ingredient can be prepared in water or water suitably diluted with, e.g., ethanol, sorbitol, glycerin, edible polyols (such as propylene glycol), and the like. As with emulsions, under ordinary conditions of storage and use the solutions likewise contain a preservative to prevent the growth of microorganisms. Sweetening, coloring, and flavoring agents are added to assure patient acceptance.

Suspension of insoluble forms of the active ingredients are conveniently prepared in water and aqueous solutions of orally acceptable liquids, such as those comprising the solutions above. The active ingredient is normally comminuted to a fine particle size for use in the suspensions, which can also contain soluble suspending agents, such as methylcellulose, acacia, tragacanth, polyvinylpyrrolidone, polyvinyl alcohol, and the like. As with the other liquid oral compositions, preservatives, coloring agents, sweeteners, and flavoring agents are added for convenience in storage and use.

Syrups contain the active ingredient in the required amount in an aqueous solution containing a sweetening agent, such as sugar, saccharin, or cyclamate salts. Colors, flavors and preservatives are again added to facilitate storage and use. The elixirs contain the active ingredient in the required amount in a hydro-alcoholic solution. Sweeteners, colors, flavors and preservatives are also added as before.

As stated above, the pharmaceutical compositions also can be in forms suited for injection use, which forms include sterile aqueous solutions or suspensions and sterile powders for the extemporaneous preparation of sterile injectable solutions or suspensions. Regardless of the particular form of a given product, certain basic requirements exist. For example, in all cases the product must be sterile and must be fluid to facilitate syringeability. It must be stable under the conditions of manufacture and storage and must be preserved against the contaminating action of bacteria and fungi. The basic solvent or suspending liquid comprises water, vegetable oils, ethanol, polyols (e.g., glycerol, propylene glycol, liquid polyethylene glycol or the like), or suitable mixtures thereof. The proper fluidity can be maintained by the use of a coating such as lecithin, by the maintainance of the required particle size in the case of suspensions, or by the use of surfactants (e.g., a condensation product of ethylene oxide with fatty acids or fatty alcohols, partial esters of fatty acids and a hexitol anhydride, and polyoxyethylene condensation products of the esters) and suspending agents (e.g., gelatin, polyvinylpyrrolidone, and sodium carboxymethylcellulose). In the case of sterile powders solid polyethylene glycol can be used. Stability is maintained by control of pH through the use of buffers and stabilizers (e.g., antioxidants such as bisulfites and metabisulfites). Contamination by microorganisms can be avoided by use of various agents, such as the parabens, chlorobutanol, benzyl alcohol, phenol, sorbic acid, thimerosal, and the like. In many cases it is preferable to include isotonic agents such as sugars or salts to minimize discomfort at the injection site. Prolonged absorption of the injectable compositions from the injection site can be brought about by the incorporation of agents delaying absorption, such as alumnum monostearate and gelatin.

Sterile injectable solutions are prepared by incorporating the required amount of active ingredient in the appropriate solvent with various of the other ingredients enumerated above, as appropriate, followed by heating to sterilizing temperatures or by filter sterilizing. Generally, suspensions are prepared by incorporating the previously sterilized active ingredient into a sterile vehicle comprising the basic suspending liquid and the other ingredients as enumerated above.

In the preparation of sterile powders for use in sterile injectable solutions, the preferred method involves freeze-drying of a previously sterilized solution of the active ingredient plus any additional desired soluble ingredients to obtain a sterile, dry product. Powders for injectable suspensions are preferably sterilized by the use of a gas, such as ethylene oxide, and subsequently incorporated, with the required additional ingredients and in the proper particle size, into the basic powder for later reconstitution in the desired sterile suspending liquid.

The term "unit dosage form" as used in the specification and claims refers to physically discrete units suitable as unitary dosages for animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in animals, as disclosed in detail in this specification, these being features of the present invention. Examples of suitable unit dosage forms in accord with this invention are tablets, capsules, pills, powder or granule packets, wafers, cachets, vials teaspoonfuls, tablepoonfuls, dropperfuls, segregated multiples of any of the foregoing, and other forms as herein described.

The dosage of 7-alkyl-3-(2-amino-2-alkylethyl)indoles, dispersed in a pharmaceutically and physiologically acceptable carrier for oral or parenteral administration, ranges from about 0.5 to about 250 mg. in a single dose or in divided doses given two to four times daily. A total daily amount of from about 2 to about 50 mg. given as a single daily dose or in divided doses two to four times daily is preferred. In all instances, however, the exact dosage must be determined individually in light of the mammal's age, weight, physical condition, the severity of the condition being treated, and the route of administration employed.

In veterinary practice the present compositions can be used to elicit psychic energization in animals, as, for example, where the depression is associated with disease. The animals should receive amounts adjusted accordingly in terms of weight. The compositions are suitably administered orally in the form of tablets or boluses or by injection as a solution or suspension.

To obtain a combination of pharmacologic effects, compositions containing 7-alkyl-3-(2-amino-2-alkylethyl)indoles in combination with pharmacologically significant amounts of complementing ingredients can be given. For example, an oral unit dosage form of an effective combination product comprises from about 2.5 to about 40 mg. of 7-alkyl-3-(2-amino-2-alkylethyl)indole with one or more of the following ingredients in approximately the indicated amounts: chlordiazepoxide hydrochloride (5–15 mg.); methaminodiazepoxide (5–20 mg.); 5-hydroxytryptophan (50–300 mg.); phenobarbital or butabarbital (8–60 mg.) of amobarbital (16–120 mg.); fluphenazine dihydrochloride (0.25–5 mg.); phenothiazines such as chlorpromazine hydrochloride (10–50 mg.); meprobamate (100–400 mg.); estylurea (150–300 mg.); antiarthritic agents such as fluprednisolone (0.25–7.5 mg), methylprednisolone (0.5–10 mg.), hydrocortisone (5–25 mg.), and prednisolone or prednisone (0.5–15 mg.); analgetic agents such as aspirin (150–600 mg.), phenacetin (150–600 mg.), or N-acetyl-p-aminophenol (150–600 mg.); combinations of antiarthritics and an algetics as indicated above; progestational agents such as medroxyprogesterone (2.5–10 mg.) or hydroxyprogesterone acetate (25–50 mg.); diuretics such as ethoxzolamide (50–150 mg.) or chlorthiazide (250–500 mg.).

In the preferred embodiment of this invention a unit dosage form can contain a 7-alkyl-3-(2-amino-2-alkylethyl)indole in amounts of from about 2 to about 50 mg. per unit dosage, 5 mg. per unit dosage representing a particularly convenient amount, in combination with a solid pharmaceutical carrier as hereinbefore described for oral administration.

The active ingredient can likewise be compounded with an oral liquid pharmaceutical carrier in concentrations suitable for subdividing to unit dosage forms for convenient and effective oral administration. Suitable concentrations provide from about 0.5 to about 10 mg. per ml. Thus a teaspoonful (approximately 5 ml.) or a dropperful (approximately 0.6 ml.) provide suitable single doses for unitary administration. The preferred unit dosage for oral administration in liquid form is a teaspoonful, and suitable concentrations for such a unit dosage range from about 0.5 to about 5 mg. per ml., about 1 mg. per ml. representing a preferred concentration. For injection intravenously or interamuscularly, a sterile aqueous preparation of from about 1 to about 30 mg. per ml. is useful, about 10 mg. per ml. being preferred.

The following compositions are illustrative of the compositions of the present invention:

(1) *Tablets.*—Ten thousand tablets for oral use, each containing 5 mg. of 7-methyl-3-(2-aminobutyl)indole hydrochloride, are prepared from the following types and amounts of materials:

|  | Gm. |
| --- | --- |
| 7-methyl-3-(2-aminobutyl)indole hydrochloride | 50 |
| Lactose, U.S.P. | 1225 |
| Sucrose, powdered, U.S.P. | 1225 |
| Cornstarch, U.S.P. | 300 |

The finely powdered materials are mixed well and the mixture granulated with 10% starch paste. The wet mass is forced through an 8-mesh screen, dried at 110° F. in a forced-air oven, and then put through a 12-mesh screen. As lubricant, 30 gm. of magnesium stearate is added before compressing into tablets. The tablets are effective in treating mild depressive states in mammals when administered in dosages of one to two tablets one to four times per day.

Substituting 25 gm. of 7-methyl-3-(2-aminobutyl)indole hydrochloride for the 50 gm. in the above formulation gives tablets each containing 2.5 mg. of active ingredient. These tablets are administered on a dosage schedule of one tablet two to four times daily in the treatment of depression.

(2) *Capsules (hard-filled).*—Ten thousand two-piece hard gelatin capsules for oral use, each containing 50 mg. of 7-methyl-3-(2-aminobutyl)indole hydrochloride are prepared from the following types and amounts of materials:

|  | Gm. |
| --- | --- |
| 7-methyl-3-(2-aminobutyl)indole hydrochloride | 500 |
| Cornstarch, U.S.P. | 1875 |
| Light mineral oil, U.S.P. | 130 |
| Magnesium stearate, powder | 160 |
| Talc, U.S.P. | 160 |

The finely powdered ingredients are mixed thoroughly and then capsulated in the usual manner.

Similarly, 10,000 capsules, each containing 250 mg. of 7-methyl-3-(2-aminobutyl)indole hydrochloride are prepared by substituting for the 500 gm. of 7-methyl-3-(2-aminobutyl)indole hydrochloride in the above formula 2500 gm. of 7-methyl-3-(2-aminobutyl)indole hydrochloride.

10,000 capsules each containing 250 mg. of 2,7-dimethyl-3-(2-aminobutyl)indole acetate are similarly prepared by substituting 2,7-dimethyl-3-(2-aminobutyl)indole acetate for 7-methyl-3-(2-aminobutyl)indole hydrochloride.

The foregoing capsules find application in the treatment of mammals exhibiting mental disease characterized by moderate and severe depressive states. A suitable dosage is one 50-mg. capsule given two times daily or one 250-mg. capsule given once daily.

(3) *Syrup.*—An aqueous preparation for oral use, each 5 ml. containing 1 mg. of 7-methyl-3-(2-aminobutyl)indole free base is prepared from the following types and amounts of materials:

| | | |
|---|---|---|
| 7-methyl-3-(2-aminobutyl)indole free base | gm | 2 |
| Benzoic acid, U.S.P. | gm | 10 |
| Methylparaben, U.S.P. | gm | 20 |
| Propylparaben, U.S.P. | gm | 5 |
| Glycerin, U.S.P. | ml | 1500 |
| Tragacanth powder, U.S.P. | gm | 75 |
| Oil of orange | ml | 2 |
| Sucrose, U.S.P. | gm | 4000 |
| F.D.C. orange dye | gm | 20 |
| Deionized water, q.s. to 10,000 ml. | | |

The benzoic acid and parabens are added to the glycerin in a separate container, followed by the finely powdered 7-methyl-3-(2-aminobutyl)indole free base, tragacanth, color and flavor in the order named. This is mixed until a uniform suspension is obtained and then added to 5000 ml. of water with rapid stirring. Finally, the sugar is added and the whole mixed thoroughly by processing through a colloid mill. Sufficient water is added to bring the total volume to 10,000 ml.

The foregoing suspension is useful in treating mild depresive states on a dosage schedule of one teaspoonful four times daily.

(4) *Capsules (soft elastic).*—One-piece soft elastic gelatin capsules for oral use, each containing 2 mg. of 7-methyl-3-(2-aminobutyl)indole free base, are prepared by first dispersing the base in sufficient corn oil to render the material capsulatable and then capsulating in the usual manner.

The above capsules given on a dosage schedule of one capsule four times daily are employed in the treatment of mild depression.

(5) *Elixir.*—An elixir for oral use, each 5 ml. containing 10 mg. of 7-methyl-3-(2-aminobutyl)indole hydrochloride, is prepared by thoroughly mixing together the following materials:

| | | |
|---|---|---|
| 7-methyl-3-(2-aminobutyl)indole hydrochloride | gm | 20 |
| Saccharin sodium | gm | 125 |
| Cyclamate sodium (sodium cyclohexylsulfamate) | gm | 25 |
| Sucrose | gm | 3000 |
| Ethanol, 95% | ml | 1500 |
| Propylene glycol | ml | 1000 |
| F.D.C. yellow dye | gm | 10 |
| Lemon flavor | gm | 20 |
| Deionized water, q.s. to 10,000 ml. | | |

The above elixir is administered on a dosage schedule of one teaspoonful three times daily for treatment of moderate depressive states.

(6) *Injectable solution.*—A sterile aqueous preparation suitable for intramuscular injection and containing 2 mg. of 2,7-dimethyl-3-(2-aminobutyl)indole acetate in each milliliter is prepared from the following types and amounts of materials:

| | Gm. |
|---|---|
| 2,7-dimethyl-3-(2-aminobutyl)indole acetate | 2 |
| Chlorobutanol | 3 |
| Water for injection, q.s. to 1000 ml. | |

Administration of the above preparation on a dosage schedule of 1 ml. three or four times daily is useful in the treatment of moderate depression.

Substituting 10 gm. of 7-propyl-3(2-aminopropyl)indole tartrate for the active ingredient above is productive of a sterile aqueous preparation for intravenous or intramuscular injection containing 10 mg. per ml. of 7-propyl-3-(2-aminopropyl)indole tartrate, which is administered on a dosage schedule of 1 ml. daily.

(7) *Tablets.*—One thousand tablets for oral use, each containing 2.5 mg. of 2,7-dimethyl-3-(2-aminobutyl)indole acetate and 1 mg. of fluphenazine dihydrochloride are prepared from the following materials:

| | Gm. |
|---|---|
| 2,7-dimethyl-3-(2-aminobutyl)indole acetate | 2.5 |
| Fluphenazine dihydrochloride | 1 |
| Lactose | 125 |
| Cornstarch | 65 |
| Magnesium stearate | 25 |
| Light liquid petrolatum | 3 |

The ingredients are thoroughly mixed and slugged. The slugs are broken down by forcing through a No. 16 screen. The resulting granules are then compressed into tablets.

In the foregoing compositions, the racemic mixture of the free base or the indicated acid addition salt has been employed. Similarly, in each of said compositions, either the *d-* or *l-*form, substantially free of the other isomer, can be substituted for the racemate.

I claim:

1. A method for treating mental depression in mammals which comprises: administering to said depressed mammal in unit dosage form a composition containing from about 0.5 to about 250 mg. of a compound selected from the group consisting of (1) 7-alkyl-3-(2-aminobutyl)indole free bases having the formula:

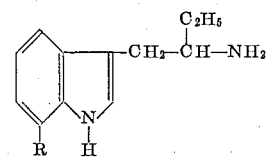

wherein R is alkyl of 1 to 4 carbon atoms, inclusive, and (2) pharmacologically acceptable acid addition salts thereof.

2. A method for treating mental depression in mammals which comprises: administering to said depressed mammal in unit dosage form a composition containing from about 2 to about 50 mg. per dosage unit of a compound selected from the group consisting of (1) 7-methyl-3-(2-aminobutyl)indole free base and (2) the hydrochloride salt thereof.

References Cited by the Examiner

FOREIGN PATENTS 807,876   1/1959   Great Britain.

OTHER REFERENCES

Vane: British J. Pharmacology, volume 19, pages 87 to 105 (1959).

Young: J. Chem. Soc. (London), pages 3493–3496 (1958).

JULIAN S. LEVITT, *Primary Examiner.*

N. S. MANN, S. J. FRIEDMAN, *Assistant Examiners.*